United States Patent
Shigeta et al.

(10) Patent No.: US 10,324,675 B2
(45) Date of Patent: Jun. 18, 2019

(54) COMMUNICATION APPARATUS, COMMUNICATION CONTROL METHOD, AND COMPUTER-READABLE STORAGE MEDIUIM

(71) Applicant: SONY CORPORATION, Tokyo (JP)

(72) Inventors: Osamu Shigeta, Tokyo (JP); Shunichi Kasahara, Kanagawa (JP); Yasuyuki Koga, Kanagawa (JP); Seiji Suzuki, Kanagawa (JP); Kazuyuki Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 375 days.

(21) Appl. No.: 15/014,753

(22) Filed: Feb. 3, 2016

(65) Prior Publication Data
US 2016/0210096 A1    Jul. 21, 2016

Related U.S. Application Data

(63) Continuation of application No. 14/112,392, filed as application No. PCT/JP2012/002524 on Apr. 12, 2012, now Pat. No. 9,274,689.

(30) Foreign Application Priority Data

Apr. 25, 2011   (JP) ................................. 2011-097391

(51) Int. Cl.
G06F 3/048     (2013.01)
G06F 3/14      (2006.01)
(Continued)

(52) U.S. Cl.
CPC .............. *G06F 3/14* (2013.01); *G06F 1/1692* (2013.01); *G06F 3/017* (2013.01); *G06F 3/0484* (2013.01); *G06F 3/0486* (2013.01); *G06F 3/0488* (2013.01); *G06F 3/04817* (2013.01); *G06F 3/04883* (2013.01); *G09G 5/12* (2013.01); *H04M 1/7253* (2013.01); *G06F 2200/1637* (2013.01); *G06F 2203/04804* (2013.01); *G09G 2370/16* (2013.01); *H04M 2250/22* (2013.01)

(58) Field of Classification Search
CPC .... H04L 29/06; H04L 65/403; H04L 2209/80
See application file for complete search history.

(56) References Cited

U.S. PATENT DOCUMENTS

| | | | | |
|---|---|---|---|---|
| 6,812,937 B1 * | 11/2004 | Abbott | .................... | G06F 1/163 |
| | | | | 707/E17.009 |
| 2007/0247422 A1 * | 10/2007 | Vertegaal | ................ | G06F 3/017 |
| | | | | 345/156 |

(Continued)

FOREIGN PATENT DOCUMENTS

| | | |
|---|---|---|
| CN | 101876881 A | 11/2010 |
| EP | 2107771 A | 10/2009 |
| WO | 2004/075169 A | 9/2004 |

OTHER PUBLICATIONS

Office action received for Chinese Patent Application No. 201210114972.4, dated Mar. 1, 2016, 17 pages of Office Action including 9 pages of English translation.

(Continued)

*Primary Examiner* — Claudia Dragoescu
(74) *Attorney, Agent, or Firm* — Chip Law Group

(57) ABSTRACT

A method is provided for enabling sharing of data. The method comprises defining a sharing region corresponding to a portion of a surface of an apparatus. The method further comprises enabling sharing of data with an external device in response to user input associating the data with the sharing region.

20 Claims, 12 Drawing Sheets

(51) Int. Cl.
    *H04M 1/725*      (2006.01)
    *G06F 3/0484*      (2013.01)
    *G06F 3/0488*      (2013.01)
    *G06F 1/16*      (2006.01)
    *G06F 3/01*      (2006.01)
    *G06F 3/0481*      (2013.01)
    *G06F 3/0486*      (2013.01)
    *G09G 5/12*      (2006.01)

(56) References Cited

U.S. PATENT DOCUMENTS

| | | | | |
|---|---|---|---|---|
| 2010/0281363 | A1* | 11/2010 | Inaba | G06F 3/0488 |
| | | | | 715/702 |
| 2011/0083111 | A1* | 4/2011 | Forutanpour | H04W 4/21 |
| | | | | 715/863 |
| 2011/0113090 | A1* | 5/2011 | Peeri | H04L 67/2823 |
| | | | | 709/203 |
| 2011/0187655 | A1* | 8/2011 | Min | G06F 1/1643 |
| | | | | 345/173 |
| 2011/0246894 | A1 | 10/2011 | Luo et al. | |
| 2012/0180003 | A1* | 7/2012 | Sawayanagi | G06F 3/04817 |
| | | | | 715/863 |

OTHER PUBLICATIONS

Office Action received for European Patent Application No. 12777698.7, dated May 24, 2016, 8 pages.

Office Action for CN Patent Application No. 201210114972.4, dated Oct. 26, 2016, 08 pages of Office Action and 10 pages of English Translation.

\* cited by examiner

[Fig. 1]
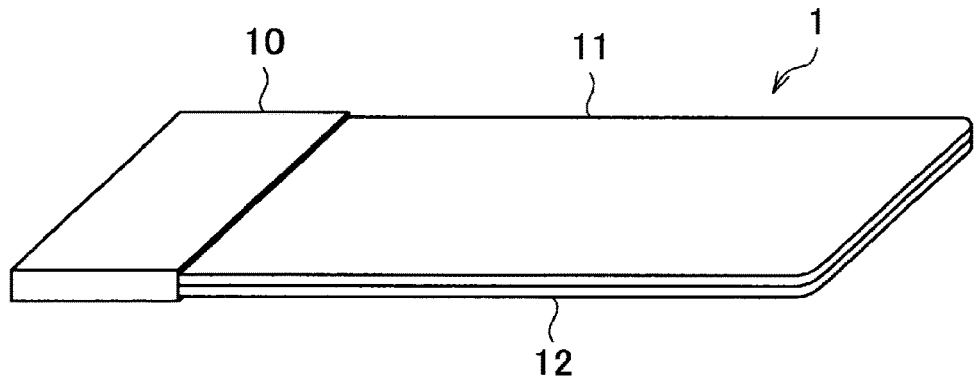
[Fig. 2]
CAUSE COMMUNICATION APPARATUSES TO OVERLAP
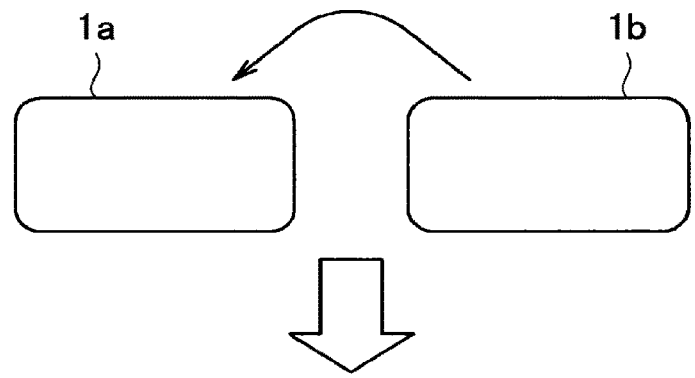
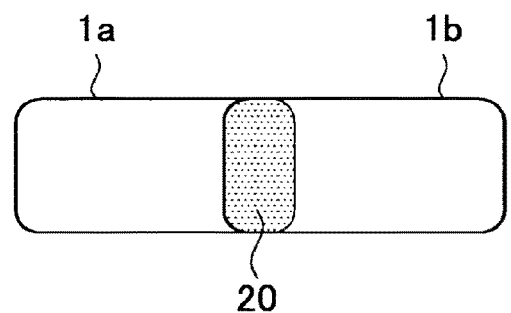

[Fig. 3]
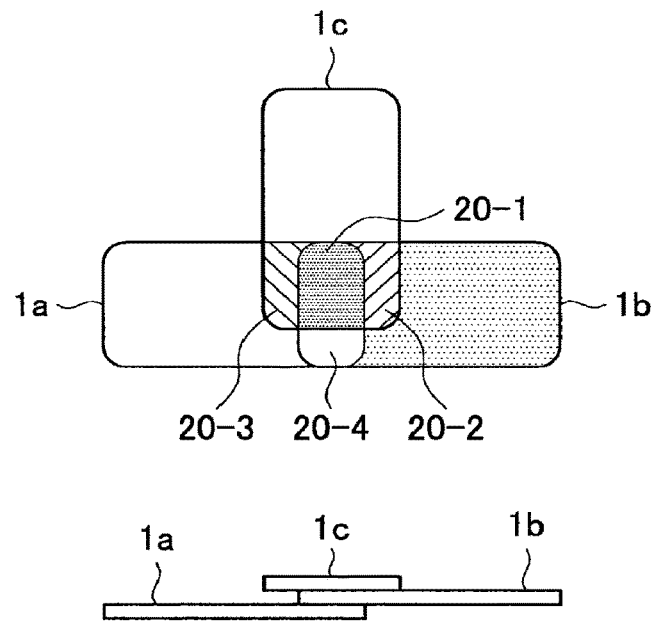
[Fig. 4]
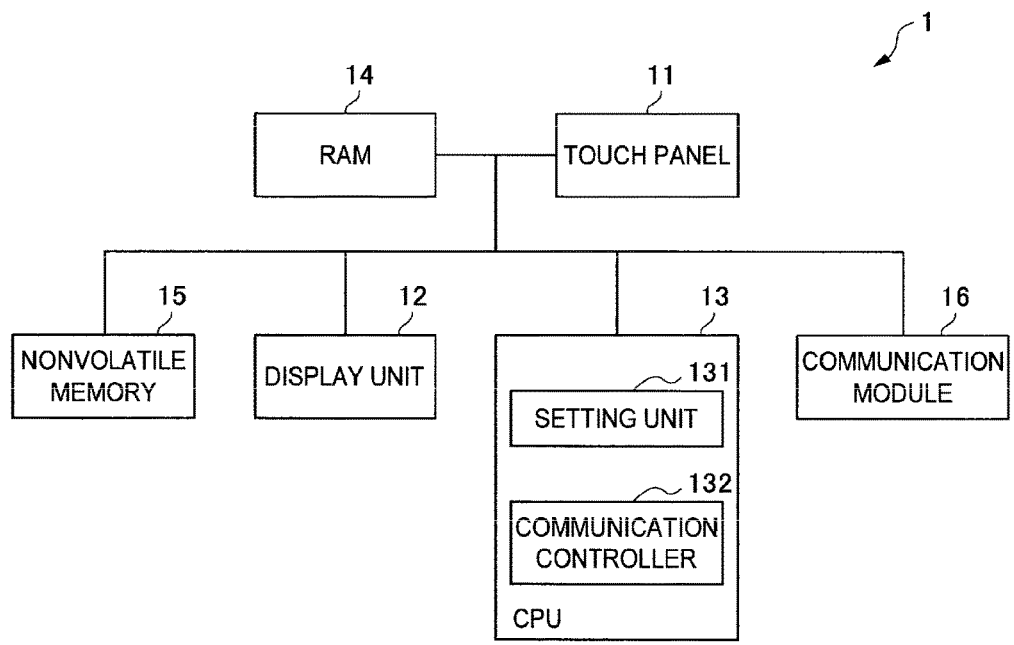

[Fig. 5]
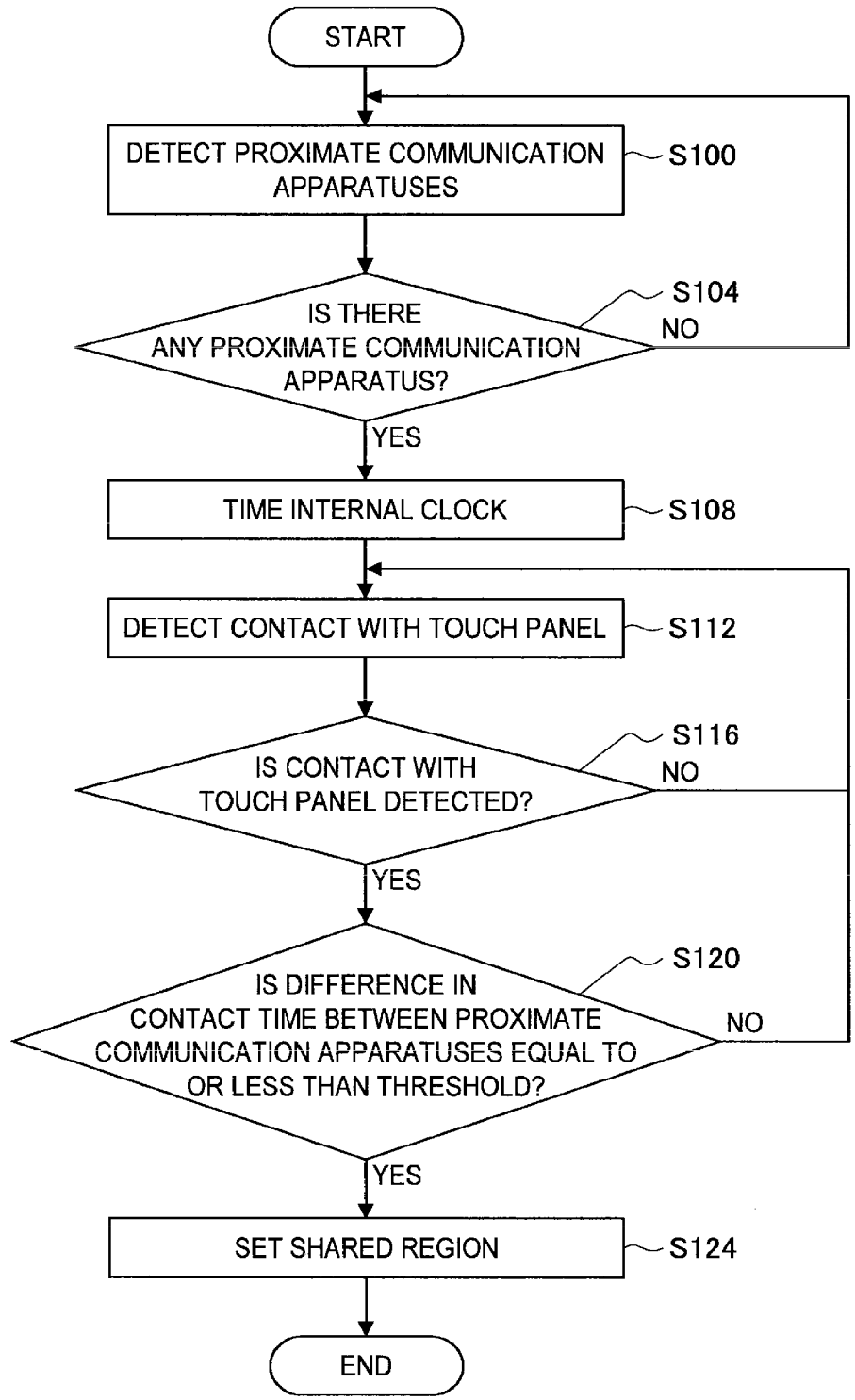

[Fig. 6]
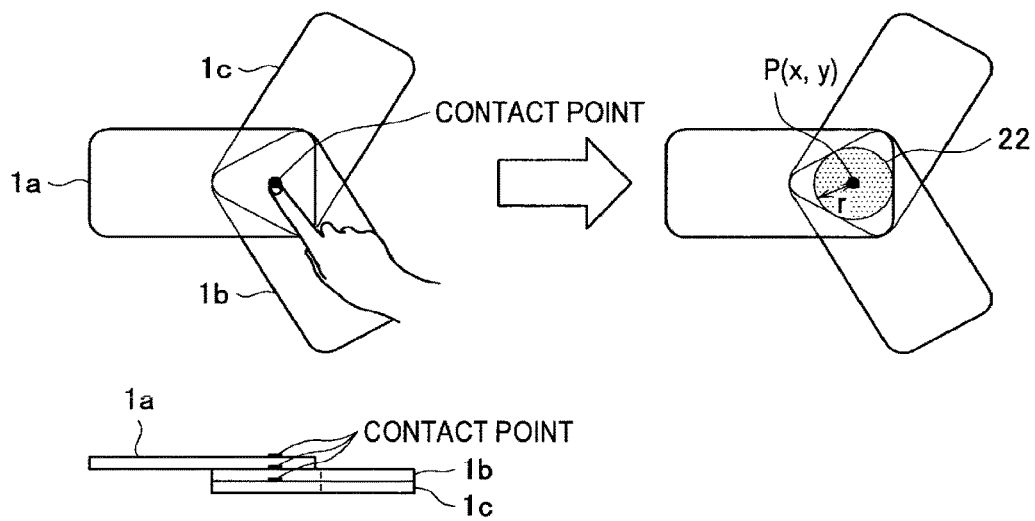
[Fig. 7]
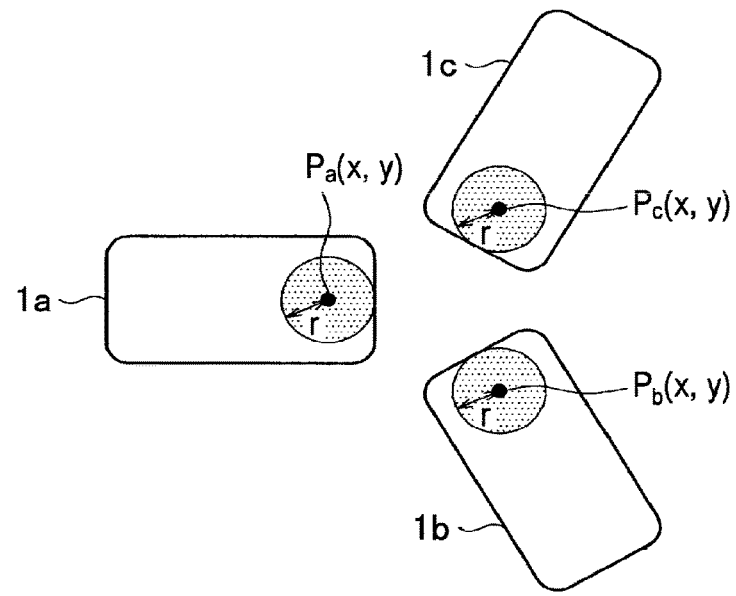

[Fig. 8]
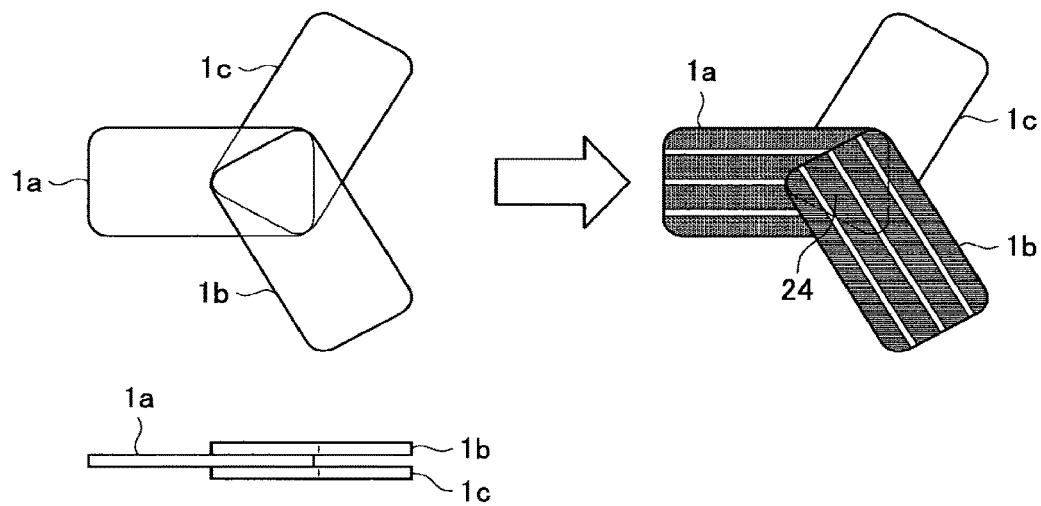
[Fig. 9]
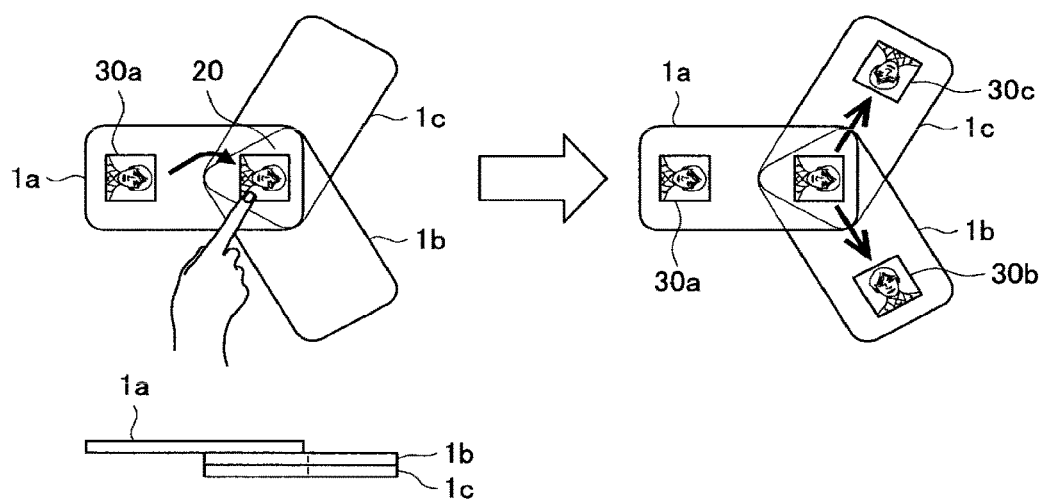

[Fig. 10]
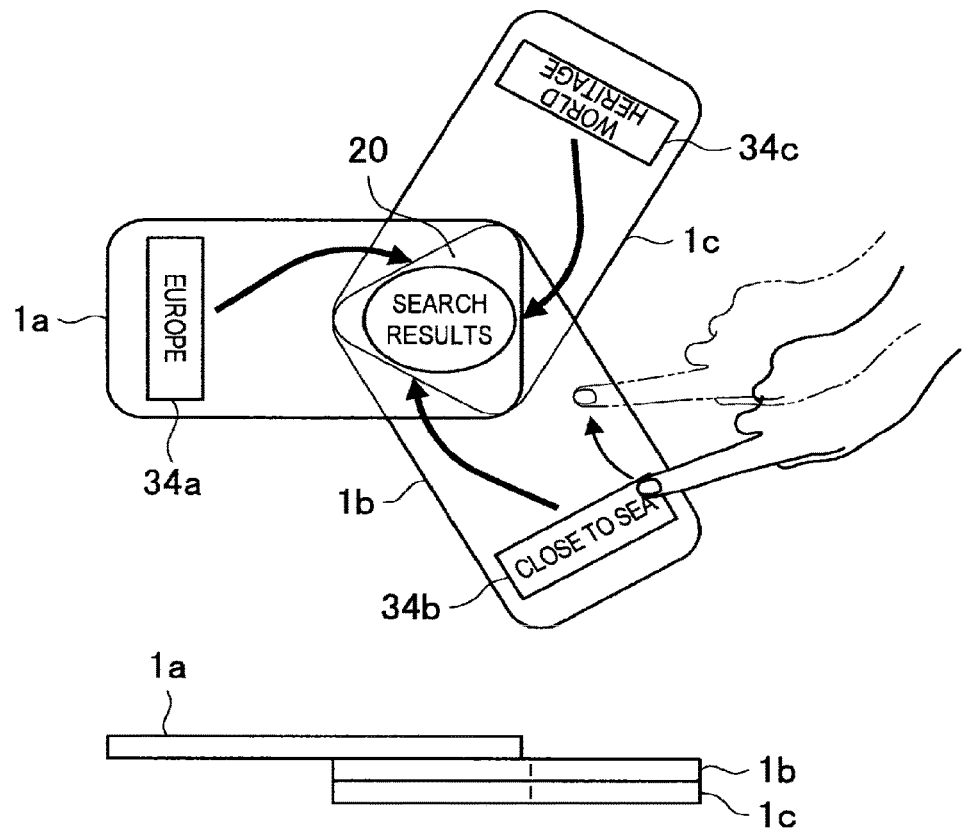
[Fig. 11]
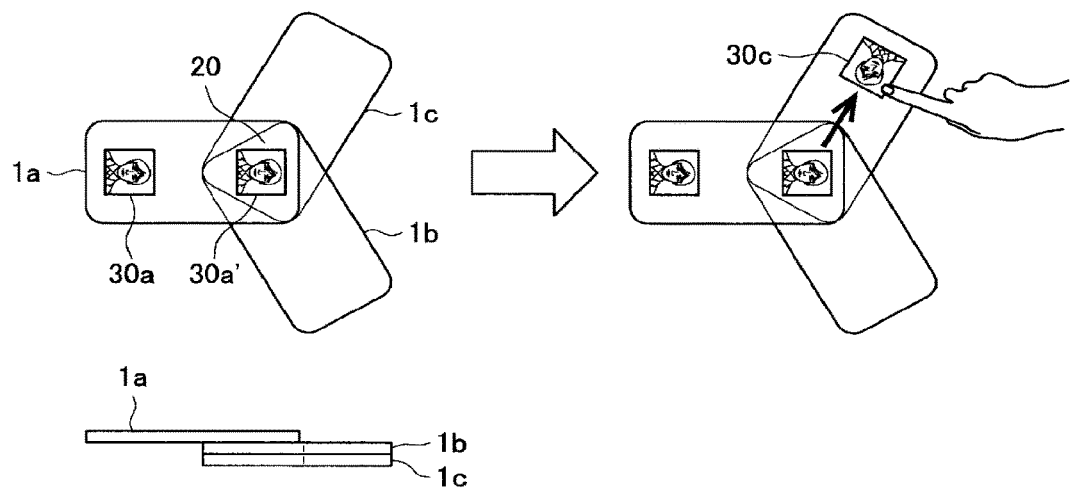

[Fig. 12]
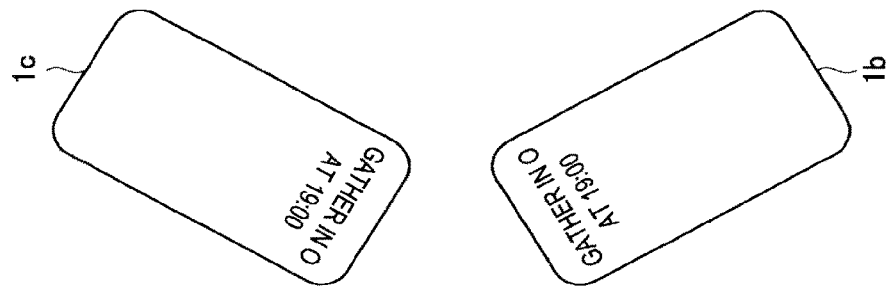
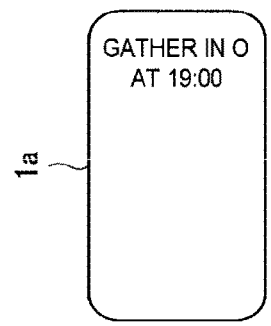
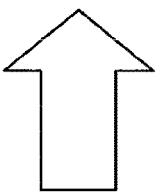
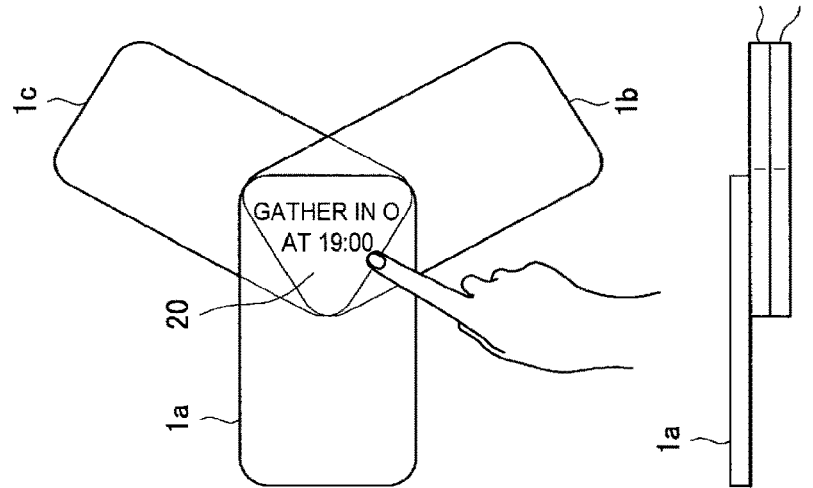

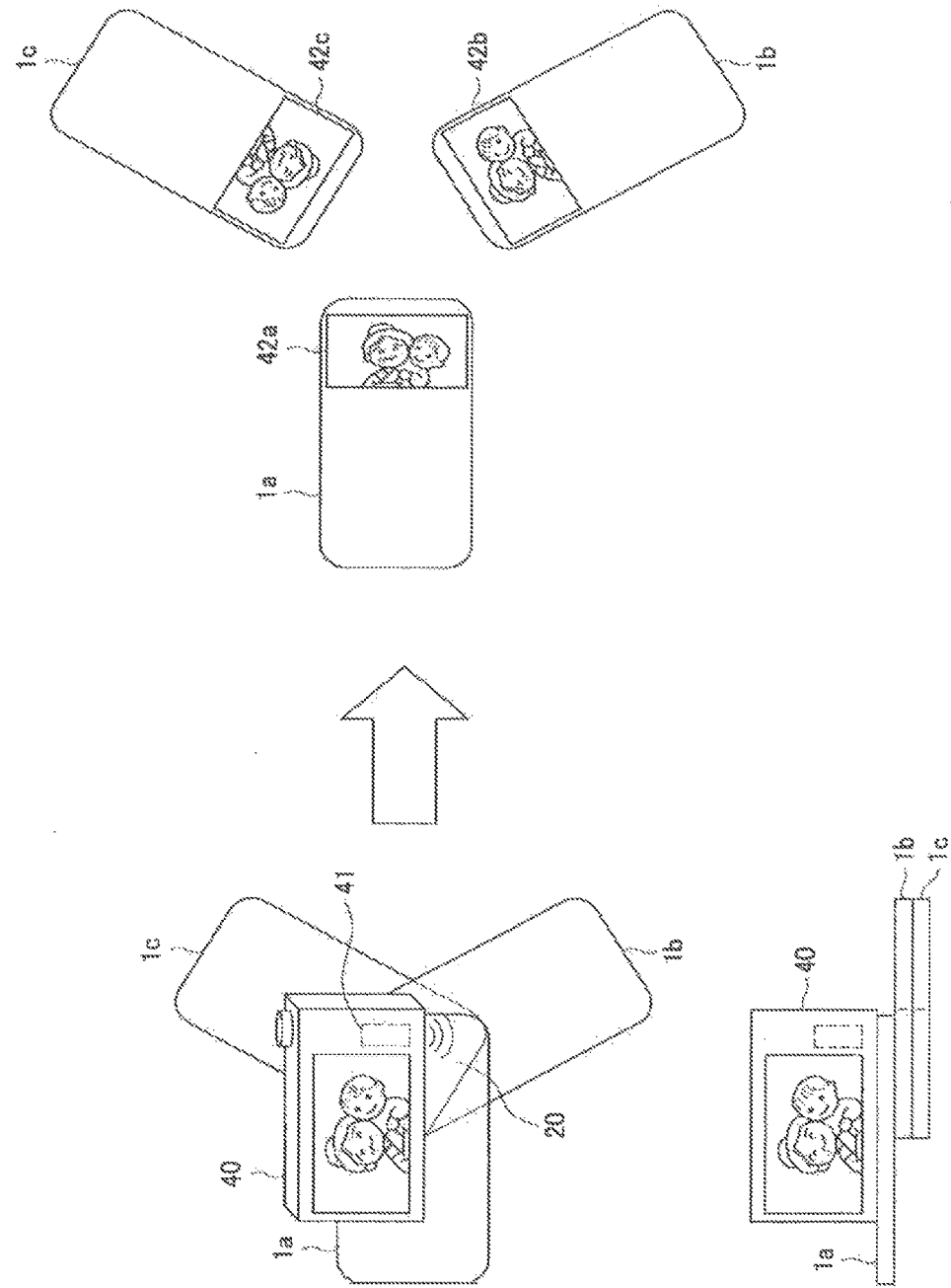
[Fig. 13]

[Fig. 14]
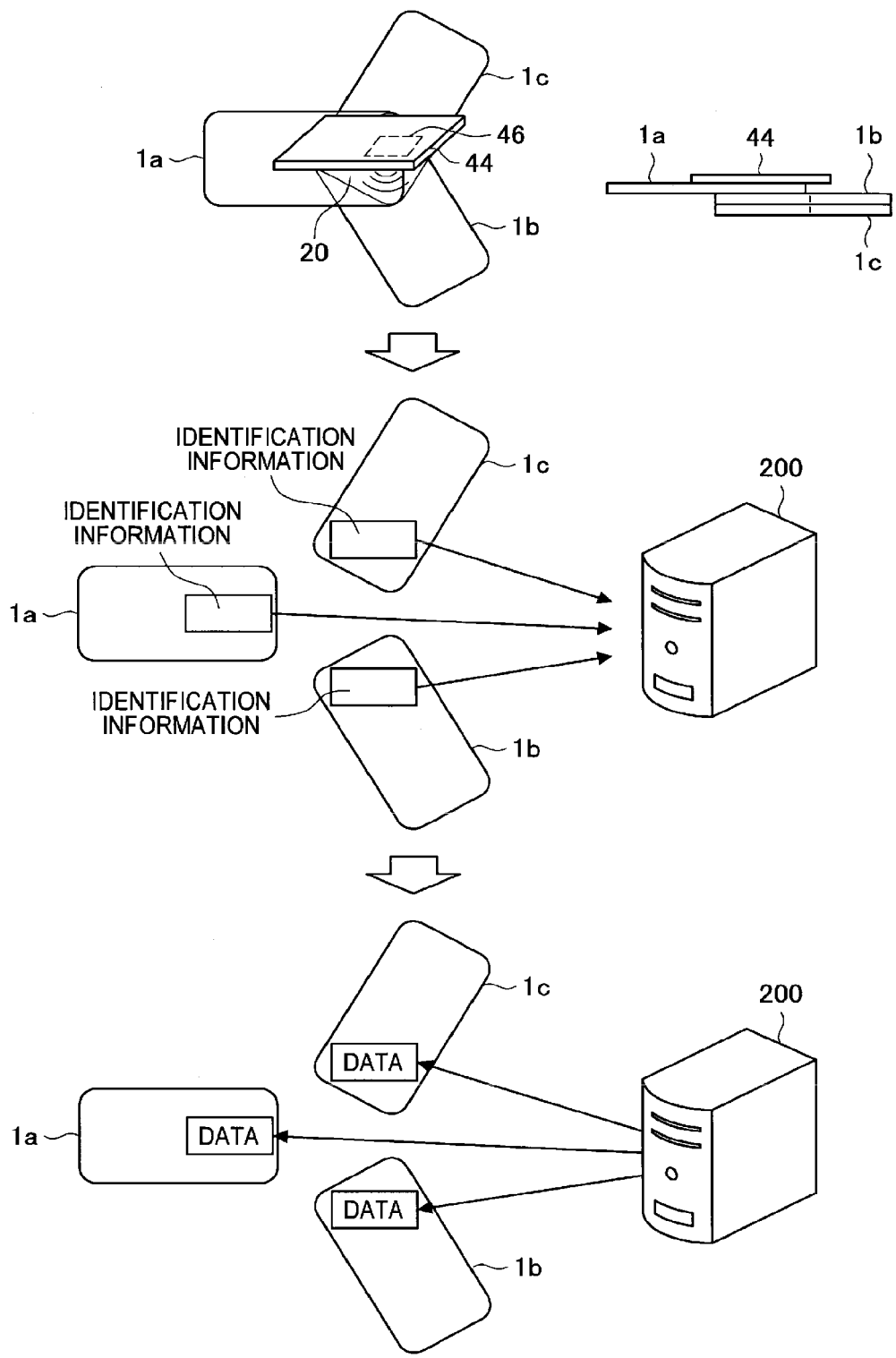

[Fig. 15]
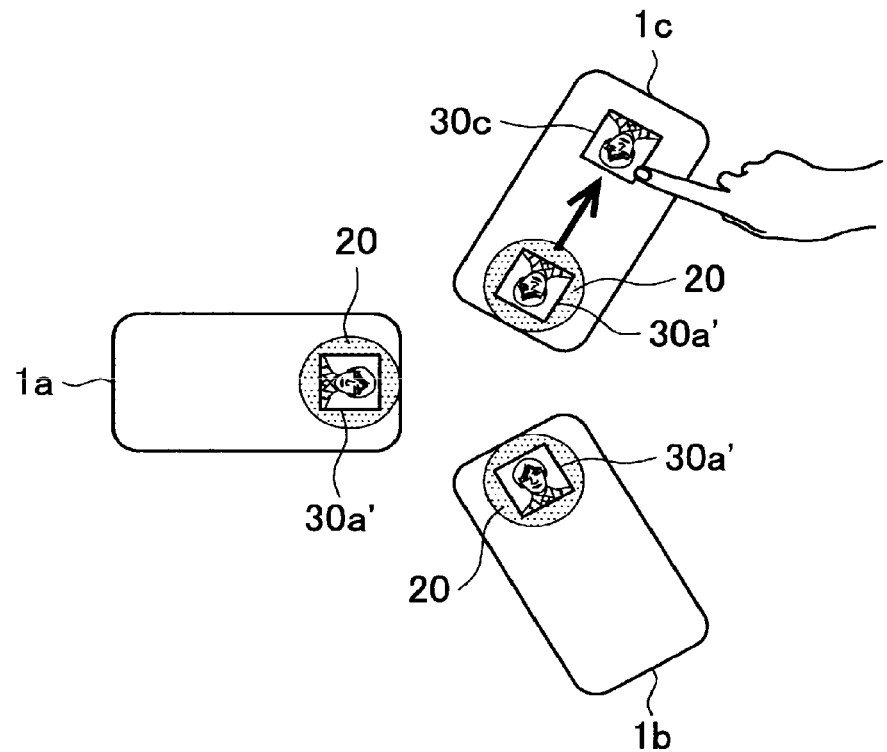
[Fig. 16]
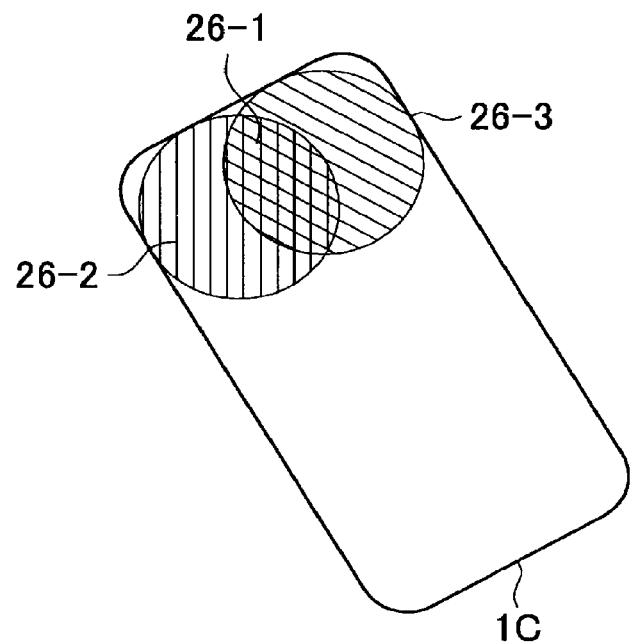

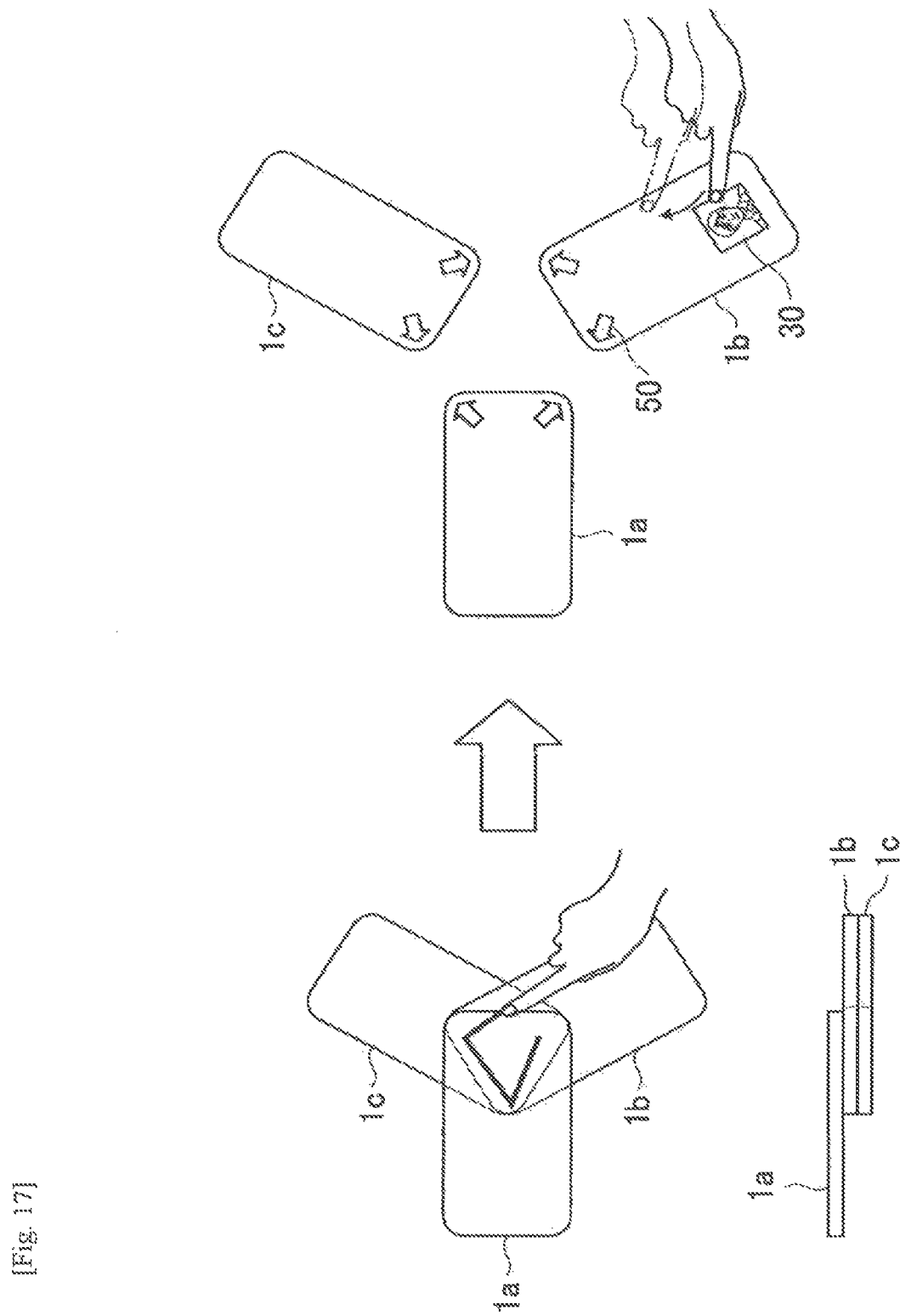
[Fig. 17]

[Fig. 18]
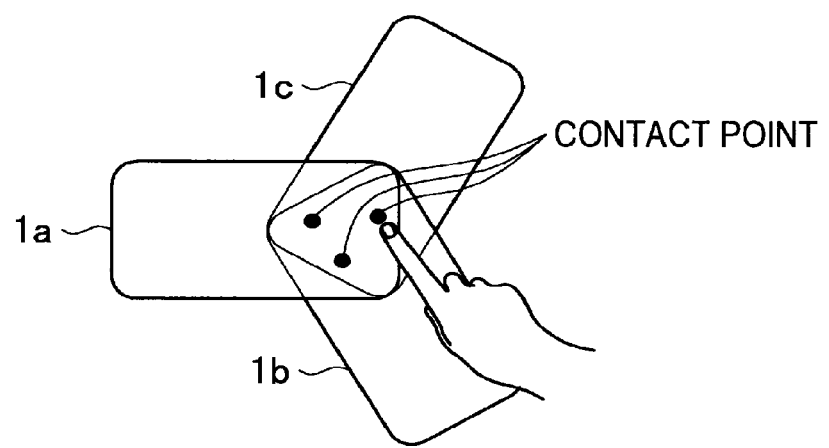

COMMUNICATION APPARATUS, COMMUNICATION CONTROL METHOD, AND COMPUTER-READABLE STORAGE MEDIUIM

CROSS-REFERENCE TO RELATED APPLICATIONS

The present application is a Continuation Application of U.S. patent application Ser. No. 14/112,392 filed on Oct. 17, 2013 which is a National Stage of International Application No. PCT/2012/002524 filed on Apr. 12, 2012 and claims priority to Japanese Application No. 2011-097391 filed on Apr. 25, 2011, the disclosures of which are incorporated herein by reference.

BACKGROUND

Description of the Related Art

In recent years, short-distance radio communication such as wireless LAN and Bluetooth including Wi-Fi is widely used and one terminal is more frequently connected to a plurality of terminals. Thus, multicast transfer that transmits the same data from one terminal to a plurality of terminals and data transfer in which one terminal selects data transmission from a plurality of terminals have been proposed and further, improvement of data transfer technology has been desired.

In communication connection and data transfer by a plurality of terminals, it is normally necessary for one terminal to select a remote terminal from a plurality of terminals. When a plurality of terminals is in a state of being connected, it is necessary for the user to select the remote terminal after understanding, for example, the name or ID to identify each terminal and it is difficult for the user to intuitively select the remote terminal.

Normally, the direction in which the remote terminal, which is a data transfer destination, is positioned is not displayed in the terminal of a data transfer source. In infrared communication performed between mobile phone terminals, for example, a progress bar to indicate the progress of task or the size of data is displayed in each terminal of the data transfer source and the data transfer destination, but no spatial relationship of each terminal of the data transfer source and the data transfer destination is displayed. Thus, if each terminal frequently transfers data when a plurality of terminals is in a connected state, it is difficult for the user to intuitively grasp what kind of data is transferred from which terminal to which terminal.

Among applications for smart phones, on the other hand, applications that intuitively grasp data transfer are known. For example, an application called Bump® that realizes data transfer by an intuitive interaction of collision of each terminal being held in a hand is distributed. Also, there is distributed a photo sharing application called Mover that realizes data transfer by an intuitive interaction of virtually displaying the data transfer direction on a screen and flicking an object in that direction.

Japanese Patent Laid-open Publication No. 2005-099064 discloses a display control apparatus that transmits video to be displayed in each display apparatus in accordance with the actual spatial relationships of a plurality of display apparatuses.

Technical Problem

However, none of the above applications is capable of realizing data transfer from one terminal to a plurality of terminals. Moreover, the virtual data transfer direction displayed on the screen is decided independently of the actual position of the terminal of the data transfer destination.

On the other hand, the display control apparatus described in JP 2005-099064 transmits data in accordance with the actual spatial relationship of a plurality of display apparatuses. More specifically, the display control apparatus described in JP 2005-099064 acquires position information from a plurality of display apparatuses having a position sensor to detect the position of each display apparatus and transmits data in accordance with the spatial relationship based on the acquired position information. The position sensor held by the display apparatus is a special sensor such as a variety of magnetic, infrared, and ultrasonic sensors, a sensor receiving a signal from a GPS satellite, and an imaging apparatus having a ranging function.

If such special sensors are used, the actual spatial relationship of a plurality of apparatuses can be grasped, but mounting such sensors increases costs. Therefore, technology that improves operability of data sharing by allowing the user to intuitively grasp the data sharing without including such special sensors is demanded.

Therefore, it is desirable to provide a novel and improved communication apparatus, communication control method, and computer-readable storage medium capable of improving operability of data sharing.

SUMMARY

Accordingly, there is provided an apparatus for enabling sharing of data. The apparatus comprises a region-defining unit configured to define a sharing region corresponding to a portion of a surface of the apparatus. The apparatus further comprises a communication unit configured to enable sharing of data with an external device in response to user input associating the data with the sharing region.

In another aspect, there is provided a method for enabling sharing of data. The method comprises defining a sharing region corresponding to a portion of a surface of an apparatus. The method further comprises enabling sharing of data with an external device in response to user input associating the data with the sharing region.

In another aspect, there is provided a tangibly embodied non-transitory computer-readable storage medium storing instructions which, when executed by a processor, cause a computer to perform a method for enabling sharing of data. The method comprises defining a sharing region corresponding to a portion of a surface of an apparatus. The method further comprises enabling sharing of data with an external device in response to user input associating the data with the sharing region.

In yet another aspect, there is provided an apparatus for enabling sharing of data. The apparatus comprises region-defining means for defining a sharing region corresponding to a portion of a surface of the apparatus. The apparatus further comprises communication means for enabling sharing of data with an external device in response to user input associating the data with the sharing region.

In yet another aspect, there is provided an apparatus for enabling receipt of data. The apparatus comprises a region-defining unit configured to define a sharing region corresponding to a portion of a surface of the apparatus. The apparatus further comprises a communication unit configured to receive data from an external device. The apparatus also comprises a display unit configured to display the received data within the sharing region.

According to the embodiments described above, there is provided a communication apparatus, a communication control method, and a computer-readable storage medium, for improving operability of data sharing.

BRIEF DESCRIPTION OF THE DRAWINGS

FIG. 1 is an external view of a communication apparatus according to an embodiment of the present disclosure.

FIG. 2 is a schematic view showing a shared region of communication apparatuses according to an embodiment of the present disclosure.

FIG. 3 is a schematic view showing the shared region of communication apparatuses according to an embodiment of the present disclosure.

FIG. 4 is a block configuration diagram of the communication apparatus according to an embodiment of the present disclosure.

FIG. 5 is a flow chart showing processing to set the shared region according to an embodiment of the present disclosure.

FIG. 6 is a diagram illustrating the range of the shared region set by the communication apparatus according to an embodiment of the present disclosure.

FIG. 7 is a diagram showing the shared region of each communication apparatus set according to an embodiment of the present disclosure.

FIG. 8 is a diagram illustrating another method of setting the shared region according to an embodiment of the present disclosure.

FIG. 9 is a diagram illustrating data sharing according to a first utilization example.

FIG. 10 is a diagram illustrating a case when a search result is displayed in the shared region for the data sharing according to the first utilization example.

FIG. 11 is a diagram illustrating the data sharing according to a second utilization example.

FIG. 12 is a diagram illustrating the data sharing according to a third utilization example.

FIG. 13 is a diagram illustrating the data sharing according to a fourth utilization example.

FIG. 14 is a diagram illustrating the data sharing according to the fourth utilization example.

FIG. 15 is a diagram illustrating a fifth utilization example.

FIG. 16 is a diagram showing an example of the shared region displayed in the communication apparatus according to the fifth utilization example.

FIG. 17 is a diagram illustrating a sixth utilization example.

FIG. 18 is a diagram illustrating the sixth utilization example.

DETAILED DESCRIPTION OF THE EMBODIMENT(S)

In the following, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

It is to be noted that the description is set forth below in accordance with the following order.
1. Overview of Communication Apparatus
2. Configuration of Communication Apparatus
3. Shared Region
3-1. Setting of Shared Region
3-2. Utilization of Shared Region
4. Conclusion

1. OVERVIEW OF COMMUNICATION APPARATUS

First, an overview of the communication apparatus according to an embodiment of the present disclosure will be provided with reference to FIG. 1. FIG. 1 is an external view of a communication apparatus 1 according to an embodiment of the present disclosure. As shown in FIG. 1, the communication apparatus 1 according to an embodiment of the present disclosure is a thin device including a main body 10, a touch panel 11, and a display unit 12. As used herein the term "unit" may be a software module, a hardware module, or a combination of a software module and a hardware module. Such hardware and software modules may be embodied in discrete circuitry, an integrated circuit, or as instructions executed by a processor.

As shown in FIG. 1, the display unit 12 according to an embodiment of the present disclosure is a thin display that is, like a flexible display, as thick as a plastic sheet. The touch panel 11 is an operation surface in a screen shape like a flexible pressure detecting touch panel provided by being stacked on the entire display unit 12. The touch panel 11 can detect a user operation by recognizing a contact point.

Further, the communication apparatus 1 according to an embodiment of the present disclosure may have flexibility in the display unit 12 and the touch panel 11 partially or wholly. Accordingly, for example, the display unit 12 and the touch panel 11 can locally be distorted by the display unit 12 and the touch panel 11 being pressed by a finger of the user.

Also, the communication apparatus 1 according to an embodiment of the present disclosure may have optical transparency in the display unit 12 and the touch panel 11 partially or wholly. Accordingly, if, for example, a plurality of communication apparatuses is caused to overlap, the user can visually recognize another communication apparatus on which the communication apparatus 1 is placed through a portion of the communication apparatus 1 having optical transparency.

The appearance of the communication apparatus 1 according to an embodiment of the present disclosure has been described with reference to FIG. 1. The communication apparatus 1 shown in FIG. 1 can easily improve operability of data sharing by setting a region of the touch panel 11 overlapping with other communication apparatuses as a shared region and controlling communication to share data with other communication apparatuses to which the shared region is set based on a user operation to the set shared region.

An overview of the shared region will be provided with reference to FIGS. 2 and 3. FIGS. 2 and 3 are schematic views showing overlapping of a plurality of communication apparatuses according to an embodiment of the present disclosure as Venn diagrams. As shown in FIGS. 2 and 3, a shared region 20 is defined as a common portion of a plurality of the communication apparatuses 1.

FIG. 2 is a diagram illustrating a case when a communication apparatus 1a and a communication apparatus 1b according to an embodiment of the present disclosure are caused to overlap. The communication apparatus 1b is placed, as shown in an upper part of FIG. 2, on top of the communication apparatus 1a and a region where the operation surfaces of the communication apparatus 1a and the communication apparatus 1b overlap like a plan view shown in a lower part of FIG. 2 is set as the shared region 20 by each communication apparatus. The side view shown in the lower part of FIG. 2 is a diagram illustrating that the communication apparatus 1b is placed on top of the communication apparatus 1a.

FIG. 3 shows a plan view and a side view illustrating a case when the communication apparatus 1a, the communication apparatus 1b, and a communication apparatus 1c according to an embodiment of the present disclosure are caused to overlap. The side view shown in the lower part of FIG. 3 is a diagram illustrating that the communication apparatus $1b$ is placed on top of the communication apparatus $1a$ and further, the communication apparatus $1c$ is placed on top of the communication apparatus $1b$.

Each of the shared regions 20 is a common portion of the plurality of communication apparatuses 1 and thus, a shared region 20-1 common to the communication apparatus $1a$, the communication apparatus $1b$, and the communication apparatus $1c$ is defined as $1a \wedge 1b \wedge 1c$, a shared region 20-2 common to the communication apparatus $1b$ and the communication apparatus $1c$ is defined as $!1a \wedge 1b \wedge 1c$, a shared region 20-3 common to the communication apparatus $1a$ and the communication apparatus $1c$ is defined as $1a \wedge !1b \wedge 1c$, and a shared region 20-4 common to the communication apparatus $1a$ and the communication apparatus $1b$ is defined as $1a \wedge 1b \wedge !1c$, where $\wedge$ is a symbol denoting a logical product (AND) and $!$ is a symbol denoting a negation (NOT).

Concrete setting processing of the shared region 20 will be described in detail in [3-1. Setting of Shared Region].

2. CONFIGURATION OF COMMUNICATION APPARATUS

Next, the configuration of the communication apparatus 1 according to an embodiment of the present disclosure will be described with reference to FIG. 4. FIG. 4 is a block configuration diagram of the communication apparatus 1 according to an embodiment of the present disclosure. As shown in FIG. 4, the communication apparatus 1 according to an embodiment of the present disclosure includes the touch panel 11, the display unit 12, a CPU (Central Processing Unit) 13, a RAM (Random Access Memory) 14, a tangibly embodied non-transitory computer readable storage medium, such as nonvolatile memory 15, and a communication module 16. The CPU 13, the RAM 14, the nonvolatile memory 15, and the communication module 16 are provided in the main body 10 shown in FIG. 1. Each component will be described below. The touch panel 11 and the display unit 12 have been described with reference to FIG. 1 and a description thereof here is omitted.

The CPU 13 controls overall operations inside the communication apparatus 1 according to various instructions and programs. The CPU 13 according to an embodiment of the present disclosure realizes, as shown in FIG. 4, functions of a setting unit 131 (i.e., a region-defining unit) and a communication controller 132 (i.e., a communication unit). The setting unit 131 sets a region of the touch panel 11 overlapping with other communication apparatuses as the shared region 20. The communication controller 132 controls communication to share data with other communication apparatuses to which the shared region is set based on a user operation to the shared region 20. Data sharing using the shared region 20 will be described in detail in [3-2. Utilization of Shared Region].

The RAM 14 temporarily stores, for example, instructions and programs used for execution by the CPU 13 and parameters appropriately changing during the execution. The nonvolatile memory 15 stores, for example, instructions and programs used by the CPU 13 and arithmetic parameters.

The communication module 16 is a communication device that transmits/receives information to/from other communication apparatuses or servers. The communication module 16 performs proximate radio communication as typified by, for example, TransferJet. It is to be appreciated that in certain embodiments the communication module 16 may communicate with other communication apparatuses or servers located remotely, for example, in a cloud computing configuration.

The communication apparatus 1 having the above configuration can easily improve operability of data sharing by a region of the touch panel 11 overlapping with other communication apparatuses being set as the shared region 20 by the setting unit 131, a user operation to the set shared region being detected by the touch panel 11, and communication to share data with other communication apparatuses to which the shared region is set being controlled by the communication controller 132 based on the detected user operation.

In the foregoing, the configuration of the communication apparatus 1 according to an embodiment of the present disclosure has been described. Next, settings of a shared region by the setting unit 131 according to an embodiment of the present disclosure will be described in detail with reference to FIGS. 5 to 18.

3. SHARED REGION

3-1. Setting of Shared Region

FIG. 5 is a flow chart showing processing to set, i.e. define, the shared region according to an embodiment of the present disclosure. First, in step S100, the communication module 16 detects other proximate communication apparatuses. If, for example, as shown in FIG. 6, the communication apparatus $1a$, the communication apparatus $1b$, and the communication apparatus $1c$ are placed with portions thereof overlapping, the communication module 16 included in the communication apparatus $1a$ detects the other communication apparatus $1b$ and communication apparatus $1c$. If the communication module 16 detects other proximate communication apparatuses as described above (step S104/Yes), the processing proceeds to step S108.

Next, in step S108, the CPU 13 times internal clocks of the other communication apparatus $1b$ and communication apparatus $1c$ detected by the communication module 16.

Next, in step S112, if the touch panel 11 detects contact with the touch panel 11 (step S116/Yes), the processing proceeds to step S120. Here, the communication apparatus $1a$ according to an embodiment of the present disclosure is placed, as indicated by a side view shown in a left part of FIG. 6, on top of other communication apparatuses and thus, if the user presses, as indicated by a plan view shown in the left part of FIG. 6, the touch panel 11 of the communication apparatus $1a$ in the topmost position, the communication apparatus $1a$ detects the contact through the touch panel 11.

Next, in step S120, the setting unit 131 determines whether a difference between time data to of the contact detected by the touch panel 11 and each piece of contact time data tm acquired from other communication apparatuses is equal to or less than a threshold.

The other communication apparatuses (the communication apparatus $1b$ and the communication apparatus $1c$) according to the present embodiment are placed, as indicated by the side view shown in the left part of FIG. 6, in the order of the communication apparatus $1a$, the communication apparatus $1b$, and the communication apparatus $1c$ from the top. Therefore, if the user touches the communication apparatus $1a$, pressure is transmitted from the communication apparatus $1a$ to the communication apparatus $1b$ placed below the communication apparatus $1a$ and to the communication apparatus $1c$ placed further below. Therefore, the communication apparatus 1b and the communication apparatus 1c each detect contact in substantially the same place as the place pressed by the user of the communication apparatus 1a substantially simultaneously. Particularly if the communication apparatus 1a has flexibility, the place touched by the user is locally distorted, making pressure more likely to be transmitted to the communication apparatus 1b and the communication apparatus 1c placed below.

The communication apparatus 1b and the communication apparatus 1c transmit the contact information (including contact time data, i.e., timing data) detected as described above to the communication apparatus 1a, which is the other proximate communication apparatus. Also, the communication apparatus 1a transmits the detected contact information (including contact time data) to the communication apparatus 1b and the communication apparatus 1c, which are the other proximate communication apparatuses. That is, contact information (including contact time data) is exchanged between a plurality of communication apparatuses.

Next, in step S120, if the difference between the contact time data tm acquired from another communication apparatus and the contact time data to detected by the touch panel 11 of the communication apparatus is equal to or less than the threshold (step S120/Yes), in step S124, the setting unit 131 sets the shared region 20 for sharing data with the other communication apparatus.

For example, the setting unit 131 sets, as indicated by a diagram shown in a right part of FIG. 6, a range of a radius r around a contact position P (x, y) detected by the touch panel 11 as a shared region 22. Further, as shown in FIG. 7, the communication apparatus 1b sets the range of the radius r around a contact position Pb (x, y) as a shared region and the communication apparatus 1c sets the range of the radius r around a contact position Pc (x, y) as a shared region. Then, communication apparatuses having the shared regions set thereto are paired to share data between the communication apparatuses based on the pairing regions.

Concrete setting processing of a shared region is not limited to the example shown in FIGS. 5 and 6. If, for example, the communication module 16 detects other communication apparatuses placed a little apart also as other proximate communication apparatuses, the setting unit 131 can set shared regions by the touch panel of each communication apparatus being touched by the user substantially simultaneously in a state of a plurality of communication apparatuses being a little apart from one another. Also in this case, as indicated by the setting processing shown in FIG. 5, the communication apparatus 1 sets the shared region if the difference between the contact time data tm acquired from another communication apparatus and the contact time data to detected by the touch panel 11 of the communication apparatus is equal to or less than the threshold.

Moreover, the placement of the shared region is not limited to being located surrounding a contact position on the touch panel 11, but instead may be defined as a virtual shared region positioned at a region of space beyond the communication apparatus in certain embodiments. For example, a communication apparatus may set a virtual shared region in a region of space away from the communication apparatus, such as a shared region set to the north of the communication apparatus. The communication apparatus may therefore detect movement toward the virtual shared region, and may perform processing to equate the movement with the virtual shared region.

Alternatively, for example, as shown in FIG. 8, the setting unit 131 may set a shared region by detecting an overlapping pattern displayed in a communication apparatus. In the example shown in FIG. 8, as indicated by a side view shown in the left part of FIG. 8, a plurality of the communication apparatuses 1 is placed in the order of the communication apparatus 1b, the communication apparatus 1a, and the communication apparatus 1c from the top. In this case, as indicated by a diagram shown in the right part of FIG. 8, a texture pattern is displayed in an optical in-cell touch panel of the communication apparatus 1a and the communication apparatus 1b, and the communication apparatus 1c captures such a texture pattern. The communication apparatus 1c detects texture overlapping from the captured image and determines a region of the communication apparatus 1c overlapping with the communication apparatus 1a and the communication apparatus 1b based on the detected texture overlapping. Then, the communication apparatus 1c sets such an overlapping region as a shared region.

In the foregoing, settings of the shared region 20 made by the setting unit 131 have been described in detail. Regions other than the range set as the shared region 20 of the touch panel 11 are called non-shared regions herein. The communication apparatus 1 may display the set shared region explicitly. Next, data sharing with other communication apparatuses using the set shared region 20 will be described by citing concrete examples.

3-2. Utilization of Shared Region

First Utilization Example

As a first utilization example, data sharing based on a user operation from a non-shared region to a shared region will be described with reference to FIG. 9. FIG. 9 is a diagram illustrating data sharing according to the first utilization example. According to the first utilization example, as indicated by a side view shown in the left part of FIG. 9, a plurality of communication apparatuses according to the present embodiment is placed in the order of the communication apparatus 1a, the communication apparatus 1b, and the communication apparatus 1c from the top. Also, as indicated by a plan view shown in the left part of FIG. 9, each of the communication apparatuses 1 has the shared region 20 to mutually share data set thereto.

The communication apparatus 1a displays, as indicated by a diagram shown in the left part of FIG. 9, an icon 30a associated with data in a non-shared region. The icon 30a is, for example, a jacket image associated with music data.

As indicated by a diagram shown in the left part of FIG. 9, a user input is provided, such as where the user touches the icon 30a and moves the icon 30a to the shared region 20 by drag & drop. Then, the communication controller 132 of the communication apparatus 1a exercises control so that data associated with the icon 30a is automatically transmitted to the communication apparatus 1b and the communication apparatus 1c, which are other communication apparatuses having the shared region. At this point, as indicated by a diagram shown in the right part of FIG. 9, the communication apparatus 1b may display an icon 30b similar to the icon 30a in the non-shared region of the communication apparatus 1b and the communication apparatus 1c may display an icon 30c similar to the icon 30a in the non-shared region of the communication apparatus 1c to explicitly indicate that the data has been transmitted.

The user operation from a non-shared region to a shared region is not limited to the drag & drop operation shown in FIG. 9. The user operation may be a drag and flick operation or, in addition to such a single-finger operation, an operation using a plurality of fingers or a user operation performed by the body of a user such as a palm may also be used.

Moreover, as the shared region may be defined as a virtual shared region located in a space away from the communication apparatus 1a in certain embodiments, the communication apparatus 1a may detect a user operation, such as a flick operation, moving data from the non-shared region to an edge of the communication apparatus 1a and in the direction of the virtual shared region. For example, a user may touch icon 30a and move the icon 30a to a northern direction toward a virtual shared region by a flick operation. Based on detecting this movement toward the virtual shared region, the communication controller 132 can exercise control so that data is automatically transmitted to the communication apparatus 1b and the communication apparatus 1c.

The data sharing based on the user operation from a non-shared region to a shared region is not limited to the data transmission shown in FIG. 9. The data sharing may be a search based on a search query or search key moved to the shared region in each of the plurality of communication apparatuses 1 or generation of a file created by merging data moved to the shared region in each of the plurality of communication apparatuses 1.

When, for example, as indicated by a plane view shown in the upper part of FIG. 10, a search key 34a "Europe" is displayed in a non-shared region of the communication apparatus 1a, a search key 34b "Close to sea" is displayed in a non-shared region of the communication apparatus 1b, and a search key 34c "World heritage" is displayed in a non-shared region of the communication apparatus 1c, if the user performs a drag and flick operation of each search key to the shared region, a search result of ANDing each search key is displayed in the shared region 20. In the example shown in FIG. 10, as indicated by a side view shown in the lower part of FIG. 10, a plurality of communication apparatuses is placed in the order of the communication apparatus 1a, the communication apparatus 1b, and the communication apparatus 1c from the top.

More specifically, one communication apparatus collects the search key moved from a non-shared region to a shared region in each communication apparatus and transmits a search key obtained by ANDing each search key to a search server on the Internet. Then, the one communication apparatus acquires a search result from the search server and transmits the acquired search result to other communication apparatuses. Alternatively, if a user operation to move the search key from a non-shared region to a shared region in each communication apparatus is detected, each communication apparatus transmits the respective search key to the search server on the Internet and the search server performs a search by ANDing the search key transmitted from each communication apparatus and transmits a search result to each communication apparatus.

According to the first utilization example in the present embodiment, data is shared based on a user operation of moving an object such as an icon and a search key from a non-shared region to a shared region and therefore, the user can intuitively grasp an operation of data sharing.

Second Utilization Example

As a second utilization example, data sharing based on a user operation from a shared region to a non-shared region will be described with reference to FIG. 11. FIG. 11 is a diagram illustrating data sharing according to the second utilization example. In the example shown in FIG. 11, as indicated by a side view shown in the left part of FIG. 11, a plurality of communication apparatuses is placed in the order of the communication apparatus 1a, the communication apparatus 1b, and the communication apparatus 1c from the top. Each of the communication apparatuses 1 has the shared region 20 to mutually share data set thereto.

The communication apparatus 1a displays, as indicated by a plan view shown in the left part of FIG. 11, the icon 30a associated with data in a non-shared region. The icon 30a is, for example, a jacket image associated with music data.

As indicated by a plan view shown in the left part of FIG. 11, the user moves the icon 30a to the shared region 20. Then, the communication controller 132 of the communication apparatus 1a exercises control so that the icon 30 is transmitted to the communication apparatus 1b and the communication apparatus 1c, which are other communication apparatuses having the shared region. The communication apparatus 1b and the communication apparatus 1c display the received icon 30 in the shared region.

Then, if, for example, a user operation to move the icon 30c displayed in the shared region of the communication apparatus 1c to a non-shared region is detected, the communication apparatus 1c receives or copies data associated with the icon 30c.

According to the second utilization example in the present embodiment, data is shared based on a user operation of moving an object such as an icon from a shared region to a non-shared region and therefore, the user can intuitively grasp an operation of data sharing.

Third Utilization Example

As a third utilization example, data sharing based on a user operation to a shared region will be described with reference to FIG. 12. FIG. 12 is a diagram illustrating data sharing according to the third utilization example. In the example shown in FIG. 12, as indicated by a side view shown in the left part of FIG. 12, a plurality of communication apparatuses is placed in the order of the communication apparatus 1a, the communication apparatus 1b, and the communication apparatus 1c from the top. Each of the communication apparatuses 1 has the shared region 20 to mutually share data set thereto.

The user inputs, as indicated by a plan view shown in the left part of FIG. 12, characters into the shared region 20 of the communication apparatus 1a by hand writing. Then, the communication controller 132 of the communication apparatus 1a exercises control so that handwritten character data are transmitted from the shared region 20 to the communication apparatus 1b and the communication apparatus 1c, which are other communication apparatuses having the shared region. The communication apparatus 1b and the communication apparatus 1c that have received handwritten character data from the communication apparatus 1a display, as indicated by a diagram shown in the right part of FIG. 12, the received handwritten character data in the respective shared regions. Incidentally, data input from the shared region is not limited to handwritten character data as shown in FIG. 12 and may be handwritten figure data.

The communication apparatus 1a may automatically transmit data input from the shared region to other communication apparatuses or input data may be transmitted to other communication apparatuses when a user operation to rub the shared region of the communication apparatus 1a is detected.

The orientation and position of characters when handwritten character data transmitted from the communication apparatus 1a is displayed in the display unit of other communication apparatuses are not limited to the example shown in FIG. 12. For example, other communication apparatuses display the received handwritten characters in the shared region overlapping with the communication apparatus 1*a* so as to match handwritten characters displayed in the communication apparatus 1*a*. Accordingly, the user can grasp an intuitive shared operation as if input data were carbon copied to other communication apparatuses positioned below. Incidentally, other communication apparatuses can display the received handwritten characters so as to match the handwritten characters displayed in the communication apparatus 1*a* by determining the spatial relationship with the communication apparatus 1*a*. The determination of the spatial relationship of each communication apparatus will be described in "Sixth utilization example".

The communication apparatus 1*a* may recognize characters input into the shared region 20 and translate the recognized characters into any language to transmit the translated characters to other communication apparatuses. The communication apparatus 1*a* may also recognize characters input into the shared region 20 and generate an encryption key from recognized characters to transmit the generated encryption key to other communication apparatuses.

According to the third utilization example in the present embodiment, data input by a user operation to a shared region is transmitted to other communication apparatuses to which the shared region is set and therefore, the user can intuitively grasp an operation of data sharing.

Fourth Utilization Example

Next, as a fourth utilization example, a case when data is shared by the data from a radio communication apparatus positioned in the shared region 20 being received by each of the communication apparatuses 1 will be described with reference to FIGS. 13 and 14. The radio communication apparatus may be a storage medium capable of performing proximate radio communication or an object including RFID (Radio Frequency Identification).

FIG. 13 shows, as an example of the radio communication apparatus, an imaging apparatus 40 including a communication unit 41 capable of performing proximate radio communication by TransferJet. The user places, as indicated by a plan view and a side view shown in the left part of FIG. 13, the imaging apparatus 40 onto the shared region 20 of a plurality of the overlapping communication apparatuses 1. Then, the plurality of communication apparatuses 1 each receives image data from the imaging apparatus 40. The plurality of communication apparatuses 1 that has received the image data each displays, for example, as indicated by a diagram shown in the right part of FIG. 13, received image data 42 in the respective shared regions.

In FIG. 14, a card 44 including an RFID 46 is shown as an example of the radio communication apparatus. The user places, as indicated by a plan view and a side view shown in the upper part of FIG. 14, the card 44 on the shared region 20 of the overlapping communication apparatuses 1. Then, each of the communication apparatuses 1 acquires, as indicated by a diagram shown in the center of FIG. 14, identification information of the RFID 46 and transmits the acquired identification information to a server 200 in a network. Then, each of the communication apparatuses 1 receives, as indicated by a diagram shown in the lower part of FIG. 14, data associated with the transmitted identification information from the server 200 in the network.

Thus, each of the communication apparatuses 1 shares data after a user places a radio communication apparatus on the shared region 20 of the communication apparatuses 1 and therefore, the user can intuitively grasp data sharing by each of the communication apparatuses 1.

Fifth Utilization Example

Next, as a fifth utilization example, a case when data is shared by a plurality of the communication apparatuses 1 to which the shared region 20 is set in a state in which the plurality of communication apparatuses 1 is kept separated will be described with reference to FIG. 15. FIG. 15 is a diagram illustrating the fifth utilization example according to the present disclosure. When, as shown in FIG. 15, data is shared while each of the communication apparatuses 1 to which the shared region 20 is set is kept separated, each of the communication apparatuses 1 displays the shared region 20. Each of the communication apparatuses 1 detects a user operation to the shared region 20 and, like the above first to fourth utilization examples, exercises communication control for data sharing.

In this case, each of the communication apparatuses 1 does not overlap and thus, each of the communication apparatuses 1 may set a region other than actually overlapping regions as the range of the shared region 20. If, for example, the communication apparatus 1*c* for which the shared regions 20-1 to 20-3 shown in FIG. 3 are actually an overlapping region is separated, as shown in FIG. 16, the communication apparatus 1*c* may display circular shared regions 26-1 to 26-3. The shared region 26-1 is used when data is shared between the communication apparatus 1*a* and the communication apparatus 1*b*, the shared region 26-2 is used when data is shared with the communication apparatus 1*b*, and the shared region 26-3 is used when data is shared with the communication apparatus 1*a*.

Thus, the communication apparatus 1 to which the shared region is set can exercise communication control to share data by using the shared region 20 even when separated from other communication apparatuses to which the shared region is set and therefore, operability of data sharing is improved. In addition, there is no need to match the range of the shared region 20 to a region actually overlapping with other communication apparatuses and therefore, the communication apparatus 1 according to the fifth utilization example can set the range of the shared region 20 so that the user can easily operate the communication apparatus 1.

Sixth Utilization Example

Next, as a sixth utilization example, a case when each of the communication apparatuses 1 determines the mutual spatial relationship will be described with reference to FIG. 17.

FIG. 17 is a diagram illustrating the sixth utilization example. A plurality of the communication apparatuses 1 is placed, as indicated by a side view shown in the left part of FIG. 17, in the order of the communication apparatus 1*a*, the communication apparatus 1*b*, and the communication apparatus 1*c* from the top. The plurality of communication apparatuses 1 has flexibility.

The user inputs, as indicated by a plan view shown in the left part of FIG. 17, any locus (e.g., by drawing a region outline) in a region where a plurality of the communication apparatuses 1 overlaps. When the communication apparatus 1*a* located in the topmost position is distorted by the press of the user, a similar locus is input into the touch panel 11 of the communication apparatus 1*b* located below. Further, if the communication apparatus 1*b* is distorted by the press of the communication apparatus 1a, a similar locus is input into the touch panel of the communication apparatus 1c located below.

Then, for example, the communication apparatus 1a acquires locus information detected by the communication apparatus 1b and locus information detected by the communication apparatus 1c and can determine the spatial relationship thereof with respect to the communication apparatus 1b and the communication apparatus 1c by performing matching processing of each piece of the acquired locus information and locus information detected by the communication apparatus 1a. Further, the communication apparatus 1b and the communication apparatus 1c can determine the spatial relationship of the three communication apparatuses after a determination result of the spatial relationship is transmitted from the communication apparatus 1a to the communication apparatus 1b and the communication apparatus 1c.

The communication apparatus 1a that has determined the above spatial relationship displays, for example, as indicated by a diagram shown in the right part of FIG. 17, arrows 50 in the directions in which other communication apparatuses are positioned according to the determination result. Thus, the directions in which other communication apparatuses are actually positioned are indicated and therefore, the user can intuitively share data. If, for example, as indicated by the diagram shown in the right part of FIG. 17, a user operation of flicking an object 30 in the direction of the arrow 50 is detected, the communication apparatus 1c transmits data associated with the object 30 to the communication apparatus 1a located in the position indicated by the arrow 50.

The determination of the spatial relationship is not limited to any locus input as shown in FIG. 17. For example, as shown in FIG. 18, each of the communication apparatuses 1 may detect a user input of a plurality of positions, such as point input of three points or more to perform matching processing of positions of points detected by each of the communication apparatuses 1.

4. CONCLUSION

As has been described above, a communication apparatus according to an embodiment of the present disclosure can improve operability of data sharing by setting a shared region of the operation surface and controlling communication to share data with other communication apparatuses to which the shared region is set based on a user operation to the set shared region.

It should be understood by those skilled in the art that various modifications, combinations, sub-combinations and alterations may occur depending on design requirements and other factors insofar as they are within the scope of the appended claims or the equivalents thereof.

In the third utilization example, for example, data input from the shared region 20 is transmitted to other communication apparatuses, but the present technology is not limited to such an example. If, for example, the user draws a "circle" in the shared region 20, the communication apparatus 1 may transmit data associated with an object displayed in a non-shared region to other communication apparatuses.

Furthermore, any reference in the claims to articles, such as "a" or "an," is to be construed as meaning "one or more."

Additionally, the present technology may also be configured as below.

(1)
An apparatus comprising:
a region-defining unit configured to define a sharing region corresponding to a portion of a surface of the apparatus; and
a communication unit configured to enable sharing of data with an external device in response to user input associating the data with the sharing region.

(2)
The apparatus of (1), wherein the region-defining unit is configured to define the sharing region by detecting a portion of the surface of the apparatus that overlaps with the external device.

(3)
The apparatus of (1) or (2), further comprising a display surface configured to display data, the display surface being stacked on the surface of the apparatus.

(4)
The apparatus of (3), wherein the display surface and the surface of the apparatus are optically transparent.

(5)
The apparatus of any of (1) to (4), wherein the region-defining unit is configured to define the sharing region by detecting a position of a user input with respect to the surface of the apparatus.

(6)
The apparatus of (5), wherein the region-defining unit is configured to define the sharing region by defining, as the sharing region, a region surrounding the detected position.

(7)
The apparatus of any of (1) to (6), wherein the region-defining unit is configured to define the sharing region based on at least one of a region outline drawn according to a user input, or a region defined by user input of a plurality of positions.

(8)
The apparatus of any of (1) to (7), wherein the communication unit is configured to transmit the data to the external device based on the user input.

(9)
The apparatus of (8), wherein the communication unit is configured to automatically transmit the data to a plurality of external devices based on the user input.

(10)
The apparatus of (8) or (9), wherein the communication unit is configured to transmit the data to the external device based on at least one of a drag-and-drop operation of the data onto the sharing region, or a flick operation of the data toward the sharing region.

(11)
The apparatus of (5) or (6), wherein the region-defining unit is configured to transmit information regarding the detected position to the external device.

(12)
The apparatus of (11), wherein the transmitted information comprises timing data.

(13)
The apparatus of (12), wherein the region-defining unit is configured to transmit information, including timing data, to the external device sufficient to cause the external device to establish a pairing region, corresponding to the set sharing region of the apparatus, based on the timing data.

(14)
The apparatus of any of (1) to (13), wherein the data comprises search query data.

(15)

The apparatus of (14), wherein the communication unit is configured to transmit the search query data to a search server based on the user input.

(16)

The apparatus of any of (1) to (15), wherein the data comprises identification information.

(17)

The apparatus of (16), wherein the communication unit is configured to transmit the identification information to a server for distribution to the external device.

(18)

A method comprising:

defining a sharing region corresponding to a portion of a surface of an apparatus; and enabling sharing of data with an external device in response to user input associating the data with the sharing region.

(19)

A tangibly embodied non-transitory computer-readable storage medium storing instructions which, when executed by a processor, cause a computer to perform a method, comprising:

defining a sharing region corresponding to a portion of a surface of an apparatus; and enabling sharing of data with an external device in response to user input associating the data with the sharing region.

(20)

An apparatus comprising:

region-defining means for defining a sharing region corresponding to a portion of a surface of the apparatus; and communication means for enabling sharing of data with an external device in response to user input associating the data with the sharing region.

(21)

An apparatus comprising:

a region-defining unit configured to define a sharing region corresponding to a portion of a surface of the apparatus;

a communication unit configured to receive data from an external device; and a display unit configured to display the received data within the sharing region.

(22)

The apparatus of (21), wherein the received data is copied to the apparatus based on a user input moving the received data from the sharing region to a non-sharing region of the surface of the apparatus.

What is claimed is:

1. An information processing apparatus, comprising:
a region-defining unit configured to define an overlapping region corresponding to a portion of a surface of the information processing apparatus, based on a difference between a first contact time data and a second contact time data,
wherein:
the portion overlaps with an external device,
the first contact time data corresponds to a contact associated with a first user input on the information processing apparatus,
the second contact time data corresponds to a contact associated with a second user input on the external device, and
at least a part of the external device is visible through the portion;
a communication unit configured to share first data with the external device based on the first user input; and
a display surface configured to display the first data,
wherein the display surface and the surface of the information processing apparatus are optically transparent.

2. The information processing apparatus according to claim 1, wherein the communication unit is further configured to transmit the first data to a plurality of external devices based on the first user input.

3. The information processing apparatus according to claim 1, wherein an orientation and a position of a display of the shared first data on the external device is further based on an orientation and a position of the external device.

4. The information processing apparatus according to claim 1, wherein an orientation and a position of a display of the shared first data on the external device is further based on an orientation and a position of the display of the first data on the information processing apparatus.

5. The information processing apparatus according to claim 1, wherein the display surface is further configured to display the overlapping region based on the portion that overlaps with the external device.

6. The information processing apparatus according to claim 1,
wherein the communication unit is further configured to receive second data from the external device, and
wherein the display surface is further configured to display the received second data within the overlapping region of the display surface.

7. The information processing apparatus according to claim 1,
wherein the communication unit is further configured to:
receive second data from the external device,
copy the received second data to the information processing apparatus based on the first user input,
wherein the first user input is to move the received second data from the overlapping region to a non-overlapping region of the surface of the information processing apparatus.

8. The information processing apparatus according to claim 1, wherein the first user input is a touch input to the information processing apparatus.

9. The information processing apparatus according to claim 1, wherein the display surface is on the surface of the information processing apparatus.

10. The information processing apparatus according to claim 1, wherein the first user input is a rub operation on the overlapping region.

11. The information processing apparatus according to claim 1, further comprising:
an input device configured to:
detect the first user input; and
generate the first contact time data,
wherein the difference between the first contact time data and the second contact time data is equal to or less than a threshold, and
wherein the communication unit is further configured to receive the second contact time data from the external device.

12. The information processing apparatus according to claim 1, wherein the communication unit is further configured to transmit the first data to the external device based on at least one of:
a drag-and-drop operation of a data icon onto the overlapping region, or a flick operation on the data icon toward the overlapping region.

13. The information processing apparatus according to claim 1, wherein the region-defining unit is further configured to define the overlapping region based on a position of a third user input on the surface of the information processing apparatus.

14. The information processing apparatus of claim 13, wherein the region-defining unit is further configured to transmit information that corresponds to the position of the third user input to the external device.

15. The information processing apparatus of claim 14, wherein the transmitted information comprises timing data.

16. The information processing apparatus of claim 15, wherein the external device establishes a pairing region corresponding to the overlapping region of the information processing apparatus based on the timing data.

17. The information processing apparatus according to claim 1,
wherein the communication unit is further configured to share the first data to a plurality of external devices based on the first user input, and
wherein the region-defining unit is further configured to define a plurality of overlapping regions corresponding to the plurality of external devices.

18. A method, comprising:
in an apparatus:
defining an overlapping region corresponding to a portion of a surface of the apparatus, based on a difference between a first contact time data and a second contact time data
wherein:
the portion overlaps with an external device,
the first contact time data corresponds to a contact associated with a first user input on the apparatus,
the second contact time data corresponds to a contact associated with a second user input on the external device, and
at least a part of the external device is visible through the portion;
sharing data with the external device based on the first user input; and
displaying the shared data.

19. A non-transitory computer readable medium having stored thereon computer-executable instructions that, when executed by a processor in an apparatus, cause the apparatus to execute operations, the operations comprising:
defining an overlapping region corresponding to a portion of a surface of the apparatus, based on a difference between a first contact time data and a second contact time data,
wherein:
the portion overlaps with an external device,
the first contact time data corresponds to a contact associated with a first user input on the apparatus,
the second contact time data corresponds to a contact associated with a second user input on the external device, and
at least a part of the external device is visible through the portion;
sharing data with the external device based on the first user input; and
displaying the shared data.

20. The information processing apparatus according to claim 1, wherein an orientation and a position of a display of the shared first data on the external device is based on an orientation and a position of the information processing apparatus that shared the first data.

* * * * *